Oct. 13, 1959     H. J. SCHROEDER     2,908,401
SWING CONTROL FOR TRACTOR MOUNTED IMPLEMENTS
Filed July 29, 1957     2 Sheets-Sheet 1
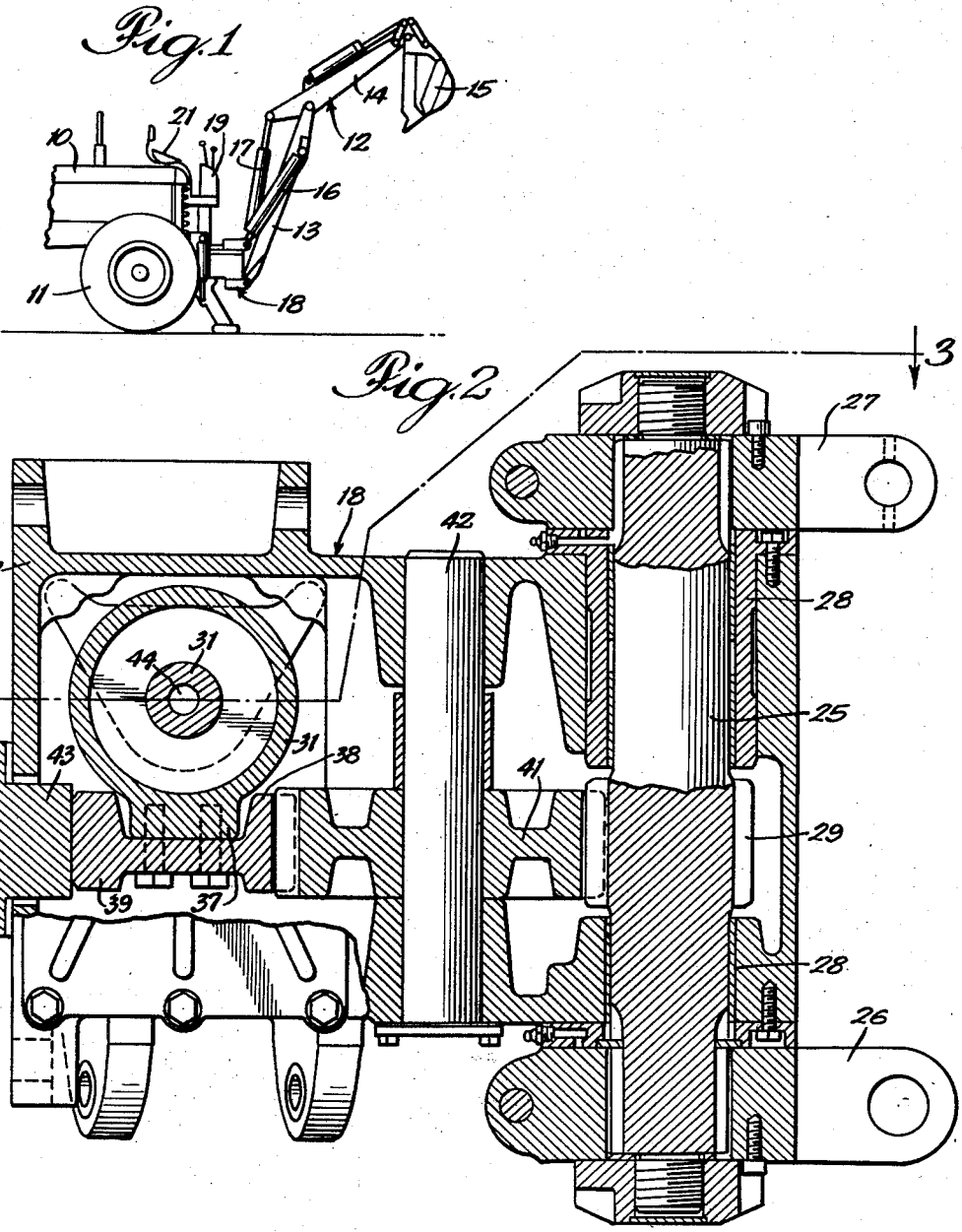
INVENTOR:
Harry J. Schroeder,
BY Bair, Freeman & Molinare
ATTORNEYS.

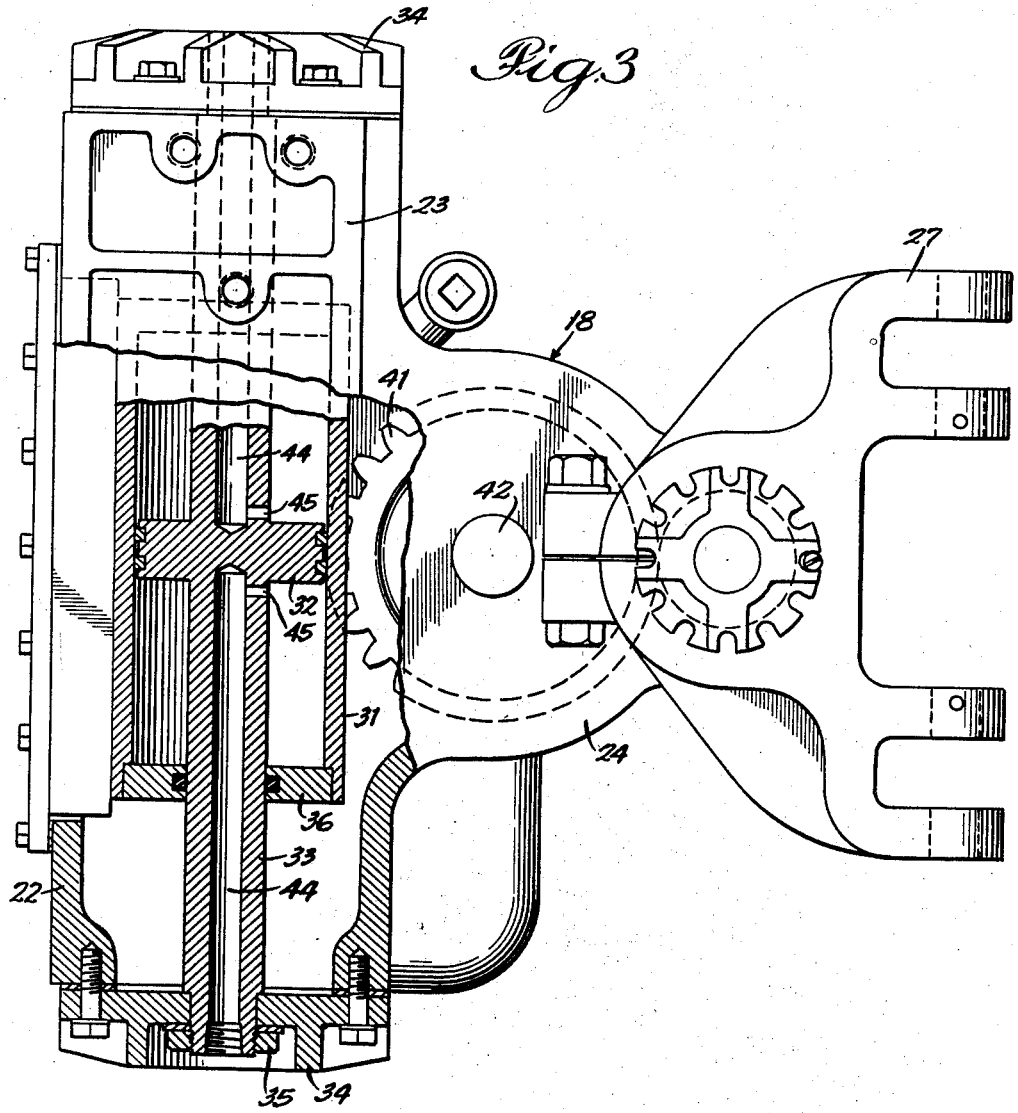

United States Patent Office 2,908,401
Patented Oct. 13, 1959

2,908,401

SWING CONTROL FOR TRACTOR MOUNTED IMPLEMENTS

Harry J. Schroeder, Milwaukee, Wis., assignor, by mesne assignments, to Allis-Chalmers Manufacturing Company, West Allis, Wis., a corporation of Delaware Application July 29, 1957, Serial No. 674,844

3 Claims. (Cl. 212—68)

This invention relates to a swing control for tractor mounted implements and more particularly to a mechanism for controlling swinging of an implement such as a back hoe about a vertical pivotal mounting on a tractor vehicle.

Many implements, such as back hoes, cranes, and the like, are mounted on tractors for swinging about a vertical pivotal axis so that they can work over a substantial angular range without moving the tractor. To control swinging of such implements, many different types of mechanisms have been proposed, including cable operated mechanisms, linkages, and the like. Such mechanisms are relatively complex and bulky and are difficult to control to provide accurate angular positioning of the implement.

It is accordingly one of the objects of the present invention to provide a swing control for tractor mounted implements which is simple and compact in construction and which is easily controlled to position the implement accurately and to maintain it securely in the desired angular position.

Another object is to provide a swing control in which the implement is swung through a gear section on the vertical pivot shaft by which the implement is supported and a rack operatively engaging the gear section and carried by a longitudinally shiftable hydraulic cylinder.

According to a feature of the invention, the rack and gear section mesh directly with an idler pinion rotatable on a vertical shaft in the casing to provide adequate clearance and the desired gear ratio.

A further object is to provide a swing control in which the rack projects vertically from a horizontal surface of the cylinder and carries a block opposite to the rack tooth which slidably engages a horizontal elongated surface in the casing to take the thrust of the gear teeth and to hold the cylinder against turning about the piston and piston rod.

The above and other objects and features of the invention will be more readily apparent from the following description when read in connection with the accompanying drawings, in which:

Figure 1 is a partial elevation of a tractor equipped with a swing control for a back hoe according to the invention;

Figure 2 is a vertical section with parts in elevation through the swing control; and Figure 3 is a top plan view with parts in section of the swing control.

As shown in Figure 1, the swing control of the invention is adapted to be mounted on a conventional tractor of any desired type which is illustrated as having a body 10 supported on wheels 11 for movement over the ground. It will be understood that the implement could equally well be mounted on a crawler type tractor or on a conventional truck, or the like, the tractor shown being for illustrative purposes only.

The tractor is adapted to support an implement, illustrated as a back hoe 12, including a main boom 13 pivoted at its lower end on the tractor and pivotally connected to an arm 14 on which a bucket 15 is pivotally mounted. Vertical swinging of the boom 13 is controlled by hydraulic cylinders 16 and a pivotal movement of the dipper stick on the boom is controlled by a hydraulic cylinder 17 pivotally connected at one end to the boom and at its opposite end to the dipper stick. The back hoe shown is illustrated because swing controls are conventionally employed with back hoes although it will be understood that any other type of implement which it is desired to swing about a vertical pivotal mounting could be used with the swing control of the invention.

The implement is supported on the tractor through a casing, indicated generally at 18, which is rigidly mounted at one end on the tractor and which carries at its opposite end a mounting means for the implement. The implement may be controlled both as to swinging and other functions through a valve assembly 19 supported above the casing. Conveniently an operator seat, shown at 21, may be mounted adjacent to the control valve assembly, as shown.

As best seen in Figures 2 and 3, the casing 18 terminates at one end in a relatively large mounting plate 22 which may be directly bolted or otherwise secured to mounting brackets on the tractor. The mounting plate 22 forms a closure for an elongated hollow casing section 23 and beyond the section 23 the casing narrows, as shown at 24, to terminate in a relatively narrow outer end portion on which the implement is mounted.

For mounting the implement, the casing carries a vertical pivot shaft 25 adjacent its outer end which extends completely through the casing and carries mounting brackets 26 and 27. For mounting a back hoe, as shown in Figure 1, the boom 13 may be pivoted to the mounting bracket 26 and the cylinder 17 may be pivoted to the mounting bracket 27 so that when the cylinder 17 is extended or contracted, the boom will be swung in a vertical plane. The pivot shaft 25 may extend through bearing sleeves 28 in the casing and is formed in its central portion with a toothed gear section 29 through which the shaft may be turned to swing the implement.

Swinging of the implement is controlled through a fluid motor, preferably a hydraulic motor, which includes a cylinder 31 and a piston 32 supported centrally on a piston rod 33. As shown, the piston rod is of a length to extend horizontally through the elongated casing section 23 with its ends extending through cover plates 34 and secured thereto by fastenings, such as nuts 35. When the piston rod is so mounted, the piston 32 is positioned centrally of the length of the casing section 23 in alignment with the gear section 29. The cylinder fits slidably over the piston 32 with suitable sealing rings therebetween and is provided with end closures 36 fitting slidably over the piston rod ends 33 and slidably sealed thereagainst.

The cylinder 31, as best seen in Figure 2, is formed on its lower horizontal surface with one or more downwardly extending bosses 37 to which an elongated rack 38 is secured. As shown, the rack has a narrow web portion directly bolted to the boss or bosses 37 and rack teeth facing toward the gear section 29. At its opposite side the rack is formed into an elongated block 39 parallel to and facing oppositely to the rack teeth for a purpose to appear later.

In order to provide adequate space for the several parts, while maintaining a desirable gear ratio between the rack and the gear section 29, an idler pinion 41 is provided which meshes directly with the rack and with the gear section 29. As shown, the idler is supported by a vertical shaft 42 journalled in the casing 18 between the rack and the gear section and meshing directly with both of them. In this way, as the cylinder moves back and forth on the piston and piston rod, the shaft 25 will be turned to swing the implement from side to side, as desired.

In order to hold the cylinder against turning, and to take the thrust developed between the teeth of the rack and the idler pinion an elongated guide surface is provided in the casing. As shown, a guide strip 43 is detachably secured to the wall 22 of the casing and projects through an opening therein slidably to engage the block 29. By properly shimming the guide strip 43, it can be accurately positioned to insure proper meshing of the rack teeth with the idler pinion. In use as the cylinder slides back and forth the block 39 will slide along the strip 43 to take the thrust of the gear teeth and to hold the cylinder against turning about the piston and piston rod.

To control movement of the cylinder, the piston rod 33 is preferably drilled from its ends, as shown at 44, with the outer ends of the openings in the piston rod being threaded, or otherwise formed for connection of fluid supply conduits thereto. The bores in the ends of the piston rod terminate short of the center of the piston rod and communicate through ports 45 with the interior of the cylinder on opposite sides of the piston. The opposite ends of the piston rod may be connected through hoses, or suitable piping, to the control valve assembly 19 so that fluid may be selectively supplied to opposite ends of the cylinder to control its movement.

It will be seen that with the present invention, an extremely compact control unit is provided which is incorporated entirely within the casing on which the implement is supported. Due to the gear connections, a minimum of slack is provided in the connections and with the hydraulic controls the cylinder can be accurately positioned so that the implement can in turn be accurately positioned and securely held in place. The only external connections required are the hose connections from the ends of the piston rod to the control valve assembly so that there is no chance of the mechanism becoming fouled by dirt or the like.

While one embodiment of the invention has been shown and described herein, it will be understood that it is illustrative only and not to be taken as a definition of the scope of the invention, reference being had for this purpose to the appended claims.

What is claimed is:

1. A swing control for tractor mounted implements comprising a casing formed for mounting on a tractor, a vertical pivot shaft rotatably mounted in the casing, mounting means secured to the pivot shaft for mounting an implement thereon, a gear section on the pivot shaft, a horizontal piston rod fixed in the casing having a fixed piston thereon, a cylinder fitting slidably over the piston and piston rod, connections to supply operating fluid to the cylinder on opposite sides of the piston, a horizontally elongated rack carried by a generally horizontal surface of the cylinder and projecting vertically beyond the cylinder, the rack being in operative driving engagement with the gear section, a horizontally elongated guide surface carried by the casing in registry with the back of the rack, and a block carried by the rack in sliding engagement with the guide surface to prevent swinging of the cylinder and rack about the piston rod and piston.

2. The swing control of claim 1 including an idler pinion in the casing rotatable on a vertical axis and meshing with the rack and the gear section.

3. A swing control for tractor mounted implements comprising a casing formed for mounting on a tractor, a vertical pivot shaft rotatably mounted in the casing, mounting means secured to the pivot shaft for mounting an implement thereon, a horizontal piston rod fixed in the casing spaced from the pivot shaft, a piston fixed on the piston rod centrally of its length, a cylinder slidably mounted on the piston and piston rod, the piston rod being hollow from its ends substantially to its center and opening into the cylinder on opposite sides of the piston to supply operating fluid to the piston to move the same, a gear section on the pivot shaft, a rack carried by a horizontal surface of the cylinder and projecting vertically therebeyond and in operative driving engagement with the gear section, a horizontally elongated guide surface in the casing, and a block carried by the rack in sliding engagement with the guide surface.

References Cited in the file of this patent

UNITED STATES PATENTS

| | | |
|---|---|---|
| 841,649 | Howe | Jan. 15, 1907 |
| 877,635 | Dietz | Jan. 28, 1908 |
| 2,285,862 | Jeffrey | June 9, 1942 |
| 2,437,466 | Hail | Mar. 9, 1948 |
| 2,759,616 | Weyhausen | Aug. 21, 1956 |